(12) United States Patent
Stewart et al.

(10) Patent No.: US 6,295,881 B1
(45) Date of Patent: Oct. 2, 2001

(54) SENSOR PACKAGE FOR PROXIMITY DETECTORS

(75) Inventors: William J. Stewart, Fenton; David C. Macke, Glendale, both of MO (US)

(73) Assignee: BECS Technology, Inc., St. Louis, MO (US)

( * ) Notice: Subject to any disclaimer, the term of this patent is extended or adjusted under 35 U.S.C. 154(b) by 0 days.

(21) Appl. No.: 09/481,213

(22) Filed: Jan. 11, 2000

(51) Int. Cl.[7] .................................................. G08B 21/00
(52) U.S. Cl. ................................................. 73/866.5
(58) Field of Search ............................ 73/661, 628–630, 73/290 V, 304 R, 304 C, 866.5; 324/659, 663, 671, 690, 658; 361/280, 284

(56) References Cited

U.S. PATENT DOCUMENTS

| D. 369,561 | 5/1996 | Green et al. ........................ D10/46 |
| 3,826,980 | * 7/1974 | Deichelmann et al. ............ 324/663 |
| 4,345,167 | 8/1982 | Calvin .................................. 307/308 |
| 4,580,049 | 4/1986 | Johren et al. ....................... 250/267 |
| 4,990,888 | 2/1991 | Vogt et al. .......................... 340/506 |
| 5,065,139 | * 11/1991 | Shefsky . |
| 5,523,608 | 6/1996 | Kitaoka et al. ..................... 257/433 |
| 5,582,698 | 12/1996 | Flaherty et al. .................... 204/409 |
| 5,691,904 | * 11/1997 | Lysen ................................... 73/661 |
| 5,783,748 | 7/1998 | Otani .................................... 73/493 |
| 5,832,772 | 11/1998 | McEwan .............................. 73/290 |
| 5,874,679 | 2/1999 | Sokn .................................... 73/706 |

FOREIGN PATENT DOCUMENTS

92018861 * 10/1992 (WO) ..................................... 73/661

* cited by examiner

*Primary Examiner*—Robert Raevis
(74) *Attorney, Agent, or Firm*—Bryan Cave LLP

(57) ABSTRACT

A sensor package for proximity detectors adapted for use with materials having a significant angle of repose. The sensor package includes a hollow housing defining a cylindrical main body adapted to house proximity detection circuitry and a non-planar tip disposed on one end of the housing adjacent the main body. The tip portion is preferably tapered in its diameter from a dimension generally equal to the diameter of the main body to a dimension less than the diameter of the main body. The tip is adapted to house a sensing element electrically coupled to the proximity detection circuitry and disposed on an inner bottom surface of the tip portion. Preferably, the taper of the tip is selected to substantially match the angle of repose of the materials to be sensed, and may take on a wide variety of shapes including cone, frustum, pyramid, round and hemispherical. One particularly preferred tip is frustum-shaped and comprises a flat end surface having a diameter less than the diameter of the main body and a tapered side portion that extends from the outer edge of the flat end surface outwardly to the main body along a predetermined angle. In this embodiment the sensing element is substantially frustum-shaped and comprises a flat end and a side portion tapered along an angle substantially equivalent to the predetermined angle of the tapered side portion of the tip.

18 Claims, 5 Drawing Sheets

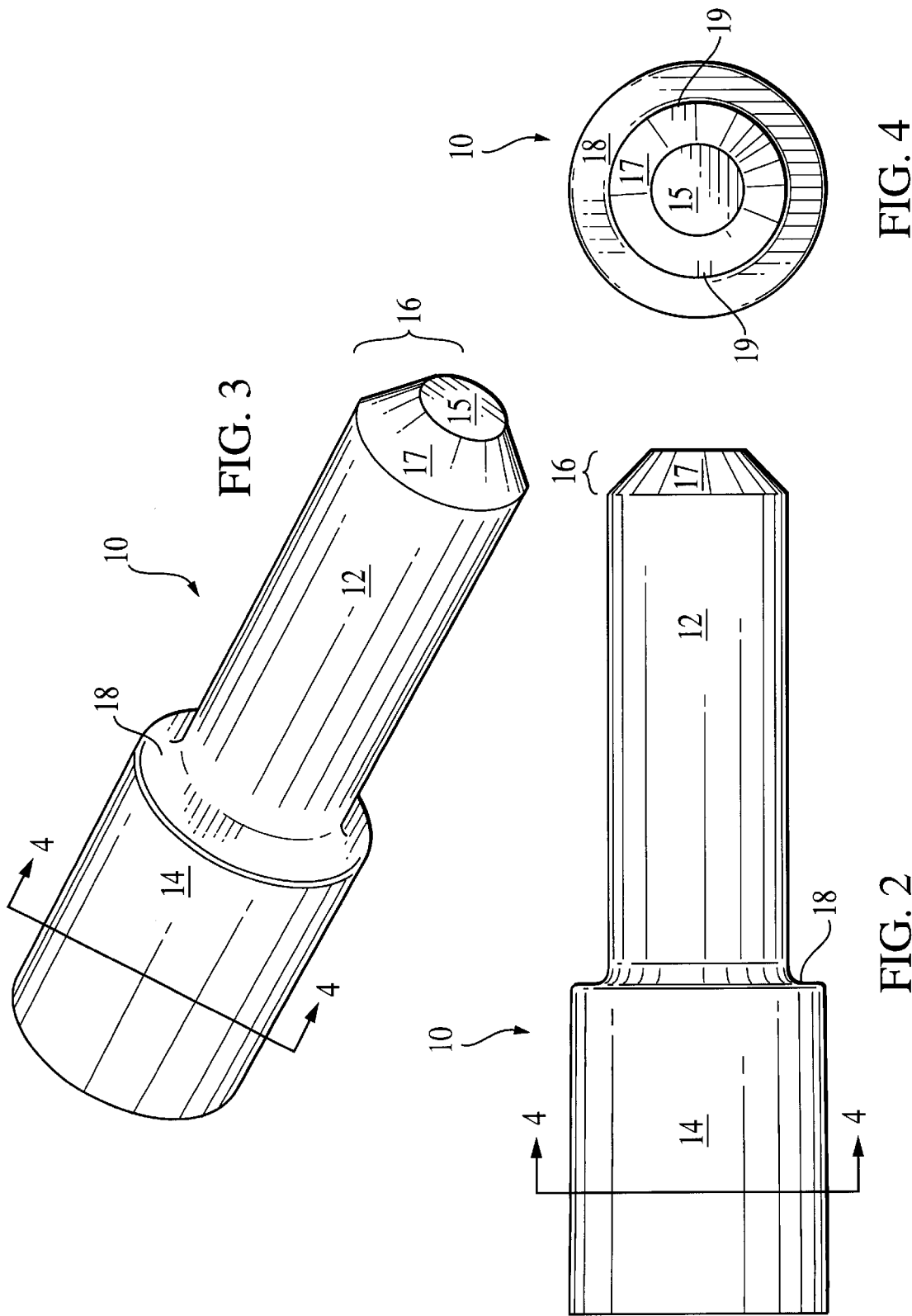

US 6,295,881 B1

SENSOR PACKAGE FOR PROXIMITY DETECTORS

FIELD OF THE INVENTION

The present invention relates generally to proximity detectors and, more particularly, to sensor packaging designed to improve the sensitivity and positioning accuracy of proximity detectors.

BACKGROUND OF THE INVENTION

A device or system having the ability to detect the presence, level, or quantity of particular materials, commonly referred to as a proximity detector, has many uses. For example, proximity detectors may be used to detect or sense the level of grain, aggregate, fluids or other materials in a storage container, or to detect the presence of a metal part on a production line. Proximity detectors have conventionally been produced in many forms including ultrasonic, capacitive, and Q sense detectors. Capacitive sensors, as shown in U.S. Pat. No. 4,345,167, sense the change in capacitance between two points (e.g., a sensing element and ground) using either a tuned oscillator or a timed RC delay circuit. Capacitive sensors are fundamentally sensitive to changes in the dielectric constant (permittivity) of the materials to be sensed. Q sense systems detect changes in the Q (merit factor) of a tuned circuit that includes the sensor element, as described in U.S. Pat. No. 5,832,772, and improvements thereto, as described in U.S. patent application Ser. No. 09/338,366. These systems are fundamentally sensitive to changes in both the permittivity and permeability of the materials to be sensed.

Conventional capacitive sensors are sensitive to changes in the dielectric constant of materials. These sensors typically include the material to be sensed as part of the dielectric material of a tuning capacitor. As the material to be sensed comes into spatial proximity of the capacitive sensor, the dielectric constant of the tuning capacitor changes, altering the capacitance of the tuning capacitor. The altered capacitance either changes the oscillation frequency of the tuned system or the time constant of an RC delay circuit. Either the oscillation frequency or the time constant is then compared to a nominal value (i.e., when the material to be sensed is not near the sensor) to determine the presence of the material.

An improved low-power proximity detector is a tuned sensor element. Using this technique, a monopole or dipole element is used as the sensor (i.e., antenna), which is coupled to circuitry designed to be sensitive to the Q of the tuned circuit. As the sensor comes near a lossy material (i.e., a material having a complex permittivity or complex permeability), the Q of the tuned circuit decreases. This decrease in Q can be detected to determine if the material is in proximity to the sensor.

Both of these types of sensors are sensitive to the quantity of electromagnetic field lines that intersect the material to be sensed. For this reason, it is important that a significant quantity of the material be in close proximity to the sensing element. Most proximity detectors are packaged into a cylindrical shape, with the sensing element at one end of the cylinder and the wiring connections located at the opposite end. This conventional configuration has a significant disadvantage when mounted vertically and used with materials that have a significant angle of repose when stored in a container (e.g., animal feed or grain). As shown in FIG. 1, when the material 20 naturally falls at a given angle, and does not fill in underneath the sensor, there is a void immediately in front of the sensor element at the tip of the sensor package. Moving the sensor element to the corner of the housing is disadvantageous because it results in a system that is sensitive to rotation.

A need remains for a proximity detector housed in a package designed to improve the responsiveness of the sensor to materials that do not flow freely (i.e., naturally rest with a significant angle of repose). The improved proximity detector would preferably ease the effort necessary to accurately position the sensing element relative to the material to be sensed.

SUMMARY OF THE INVENTION

The present invention includes a sensor package for proximity detectors designed to improve the responsiveness of the sensor to materials that do not flow freely (i.e., naturally rest with a significant angle of repose). The improved proximity detector eases the effort necessary to accurately position the sensing element relative to the material to be sensed. The present invention may be advantageously used to detect the presence of bulk materials naturally having a significant angle of repose, such as animal feed in various storage locations (e.g., silos, feed troughs, grain bins, etc.), or when positioning accuracy is desired without significant installation effort.

One embodiment of the present invention includes a sensor package for housing proximity detector components to detect the presence of materials including a hollow housing defining a cylindrical main body adapted to house proximity detection circuitry and a non-planar tip disposed on one end of the housing adjacent the main body. The tip portion is preferably tapered in its diameter from a dimension generally equal to the diameter of the main body to a dimension less than the diameter of the main body. The tip is adapted to house a sensing element electrically coupled to the proximity detection circuitry and disposed on an inner bottom surface of the tip portion. Preferably, the taper of the tip is selected to substantially match the angle of repose of the materials to be sensed, and may take on a wide variety of shapes including cone, frustum, pyramid, round and hemispherical. One particularly preferred tip is frustum-shaped and comprises a flat end surface having a diameter less the diameter of the main body and a tapered side portion that extends from the outer edge of the flat end surface outwardly to the main body along a predetermined angle. In this embodiment the sensing element is substantially frustum-shaped and comprises a flat end and a side portion tapered along an angle substantially equivalent to the predetermined angle of the tapered side portion of the tip.

Another embodiment of the present invention is a proximity detection sensor adapted to detect the presence of materials having a significant angle of repose that includes a substantially frustum-shaped sensing element comprising a flat end and a side tapered to substantially match the angle of repose of the materials. A hollow housing having a cylindrical main body houses proximity detection circuitry that is electrically coupled to the sensing element. A substantially frustum-shaped tip is disposed on one end of the housing and includes a flat end surface having a diameter less the diameter of the main body and a tapered side portion that extends from the outer edge of the flat end surface outwardly to the main body along a predetermined angle. The tip is adapted to house the sensing element disposed on an inner bottom surface of the tip.

BRIEF DESCRIPTION OF THE DRAWINGS

These and other features, aspects, and advantages of the present invention will become better understood with regard to the following description, appended claims, and accompanying drawings wherein:

FIG. 2 is a side view of the sensor package of the present invention;

FIG. 3 is a perspective view of the sensor package of the present invention;

FIG. 4 is an end view of the sensor package of the present invention taken along line 4—4 of FIGS. 2 and 3;

Figure 1:
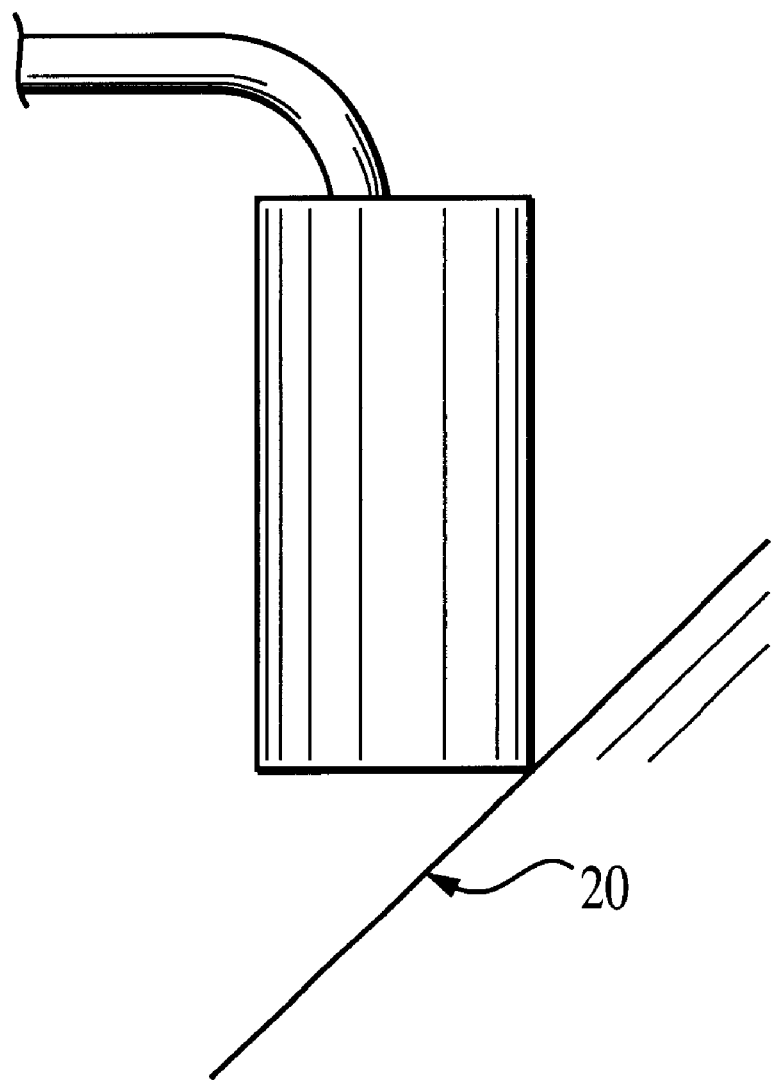
FIG. 1 illustrates a conventional prior art cylindrical sensor as used to sense the presence of material having a significant angle of repose.

These drawings are provided for illustrative purposes only and should not be used to unduly limit the scope of the present invention.

DETAILED DESCRIPTION OF THE INVENTION

FIGS. 2, 3, and 4 illustrate side, perspective and end views of one embodiment of the sensor package 10 of the present invention. The sensor package 10 includes a housing comprised of three components: a main body 12, a tip 16, and a handle 14, all of which are hollow and are preferably integrally molded together. The hollow housing defines an inner chamber that is designed to receive and retain proximity detection electronics in the main body 12 (not shown) typically including a planar circuit board hosting proximity detection circuitry. The main body 12 is preferably cylindrical-shaped, but may take on a number of other forms, including any multi-sided tubular-like shape. A sensing element (as described below) is electrically coupled to the detection circuitry and fitted within the interior of the tip 16 of sensor package 10.

The tip 16 extends from the main body 12 and has a flat end 15 and an angled side portion 17 that allows more of the material to be sensed in closer proximity to the sensing element disposed within the tip 16. The angled side portion 17 extends around the entire tip 16 in a cylindrical configuration, so that the sensor package 10 is insensitive to the rotation of the package 10. Thus, the material void common with conventional sensor packages is either significantly reduced in volume or eliminated entirely. The angle of the tip 16 is preferably selected to more closely match the angle of repose of the material to be sensed. The tip 16 is preferably tapered along the side portion 17 from a diameter substantially equivalent to the outer diameter of the main body 12 to a diameter less than the diameter of the main body 12. In one embodiment, the tip 16 may taper from the diameter of the main body 12 to a diameter approximately one-half of the diameter of the main body 12. While FIGS. 2 and 3 show the tip 16 substantially frustum-shaped with a flat end 15, the tip 16 may take on a wide variety of non-planar shapes so long as the diameter of the tip 16 decreases in a direction away from the main body 12. Thus, unlike conventional sensor packages for proximity detectors, the end of the package is not planar. Such other shapes may include conical, pyramid, rounded and hemispherical. In addition, the flat end 15 may be any circle or polygon shape, with the side portion 17 adjusted to match the shape of the flat end 15.

Figure 5:
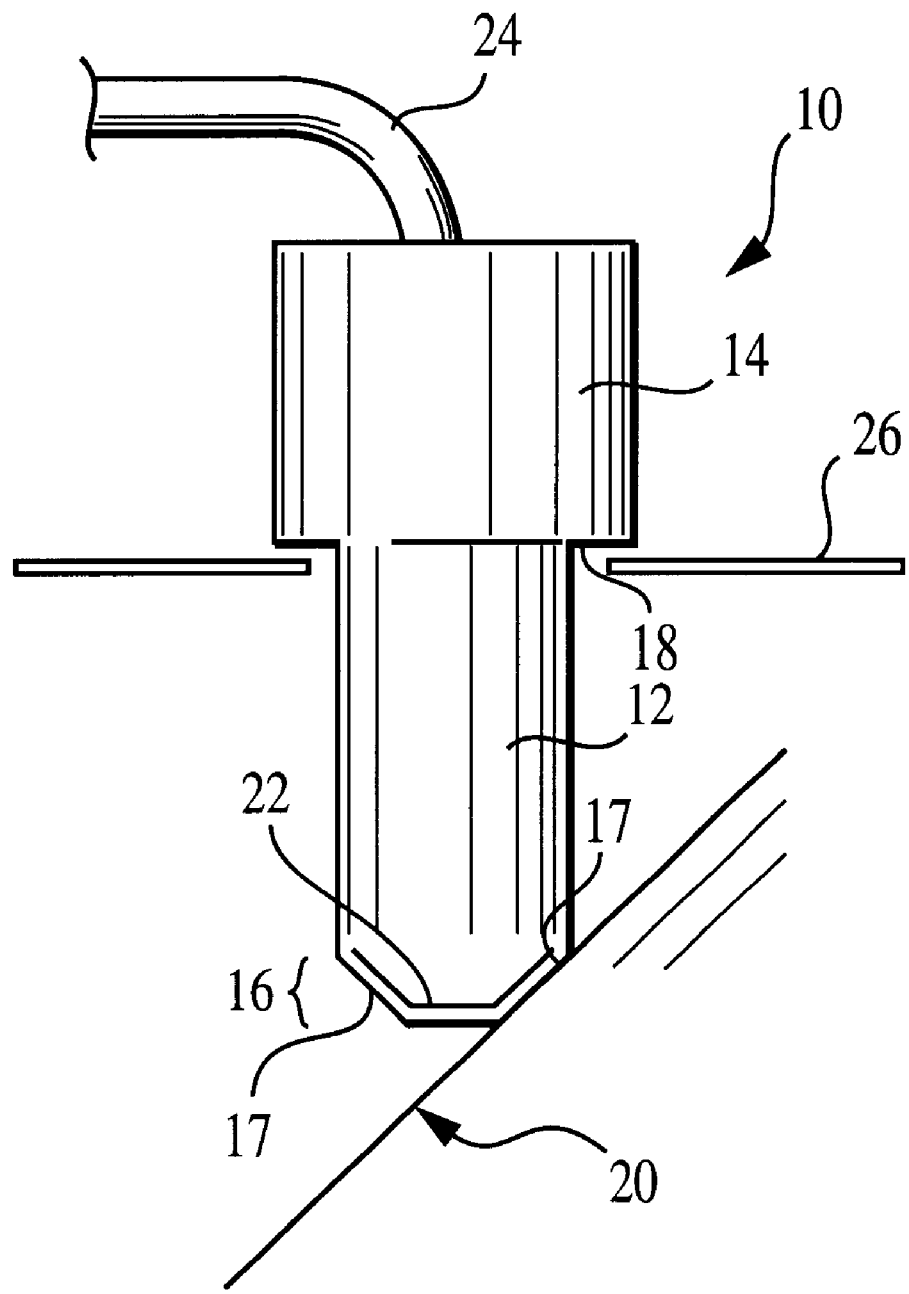
FIG. 5 is a diagram showing the presently preferred sensor package in use to sense the presence of material having a significant angle of repose.

The sensor package 10 also includes a handle 14 extending from the main body 12 opposite the tip 16 for aiding in insertion and removal of the sensor package 10 into or from a container storing material to be detected. The handle 14 has an open end opposite the main body 12 to allow for installation of the sensing element and proximity detection circuitry. Although shown as a molded part of the housing, the handle 14 can be a separate component connected to the main body 12. The handle 14 has a larger diameter than the diameter of the main body 12 and the sensor package 10 transitions from the main body 12 to the handle 14 with a step increase in diameter. The ledge 18 formed at the intersection of the main body 12 and the handle 14 retains the sensor package 10 in vertical position in use as shown in FIG. 5. Thus, as the sensor package 10 is installed for use into an opening in the container 26 from above the container 26, the installer simply pushes the sensor package 10 until it comes to a stop as the ledge 18 rests on the outer surface of the container 26. This feature of the present invention avoids the need to incorporate a grommet in tile opening of the container 26 in some installations, or to use a threaded fitting, to secure the sensor package 10 in place. In addition, this feature ensures that the tip 16 of the sensor package 10 is at a known position relative to the container 26. Finally, the larger diameter of the handle 14 provides additional volume in the interior of the sensor package 10 for bulky electrical components (e.g., power transformers).

As shown in FIG. 4, stabilizer grooves 19 may be molded into the inner surface of the main body 12 to hold the proximity detection circuitry in place. The stabilizer grooves 19 may include opposing projections facing the circuitry and defining a pair of recesses to receive and align at least two edges of the circuit board securely in place. Thus, the circuit board holding the proximity detection circuitry is preferably sized in width to snugly fit within the recesses formed by the stabilizer grooves 19. FIG. 5 illustrates a power cord 24 extending from an opening in the top of the sensor package 10. The opening may also allow control lines to extend from the proximity detector electronics housed within the main body 12 to an external control unit (not shown).

As illustrated in FIG. 5, a sensing element 22 is disposed in the interior of the sensor package 10 into the inner bottom portion of the tip 16. The sensing element 22 is preferably shaped to fit within the tapered tip 16. For example, for the embodiment shown in FIGS. 2–5 for the sensor package 10, wherein the tip 16 is frustum-shaped and comprises a flat end 15 having a diameter less than the diameter of the main body 12 and a tapered side portion 17 that extends from the outer edge of the flat end 15 outwardly to the main body 12 along a predetermined angle (selected based on the angle of repose of the material to be sensed), the sensing element 22 is preferably substantially frustum-shaped and comprises a flat portion and a side portion tapered along an angle substantially equivalent to the predetermined angle of the tapered side portion 17 of the tip 16.

Figure 6A:
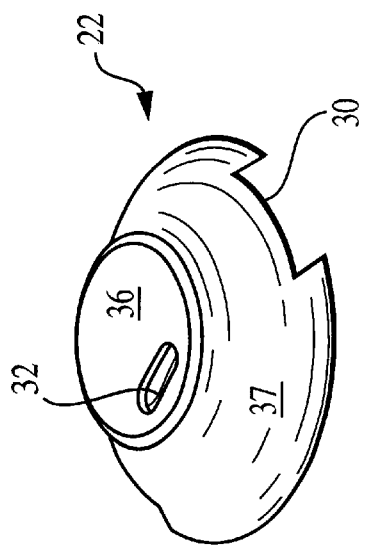
FIGS. 6A, 6B, and 6C illustrate perspective, top, and side views of a sensing element for use in connection with the sensor package of the present invention.
Figure 6B:
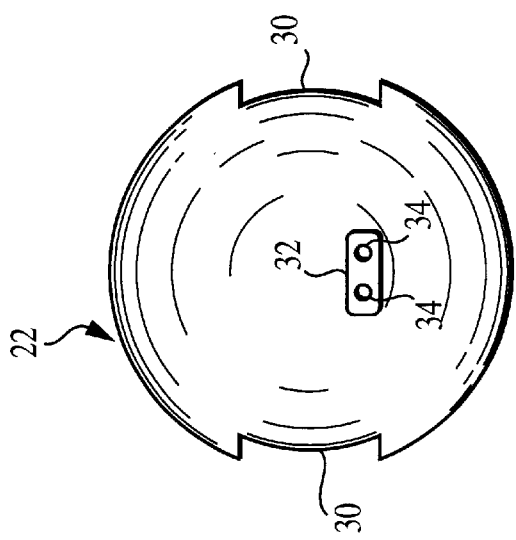
Figure 6C:
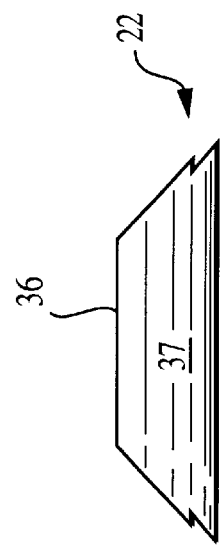

Referring now to FIGS. 6A through 6C, a sensing element 22 in accordance with one embodiment of the present invention is shown. Typically, the sensing element 22 is formed from a metal and is generally frustum-shaped with a flat portion 36 and a side portion 37 tapered along an angle substantially equivalent to the angle of the tapered side portion 17 of the tip 16. Thus, the sensing element 22 is shaped to match the shape of the interior of the tip 16. Having the sensing element 22 shaped to match the interior of the tip 16 increases the amount of material in proximity to the sensing element 22. This is particularly important in applications for sensing hard-to-detect materials, such as animal feeds, because the proximity detector is sensitive to a significant bulk of the material, not just a small amount.

The flat portion 36 of the sensing element 22 may include a solder bucket 32 to allow the sensing element 22 to be electrically coupled to the proximity detection electronics contained within the main body 12 without having the connection extend past the flat portion 36 of the sensing element 22. The sensing element 22 may include a pair of holes 34 to allow electrical connection to the proximity detection electronics and to allow the sensing element 22 to be placed as close to the front of the tip 16 as possible. The sensing element 22 may also include recesses 30 to allow the sensing element 22 to be installed over the stabilizer grooves 19 in the interior of the main body 12.

Figure 7:
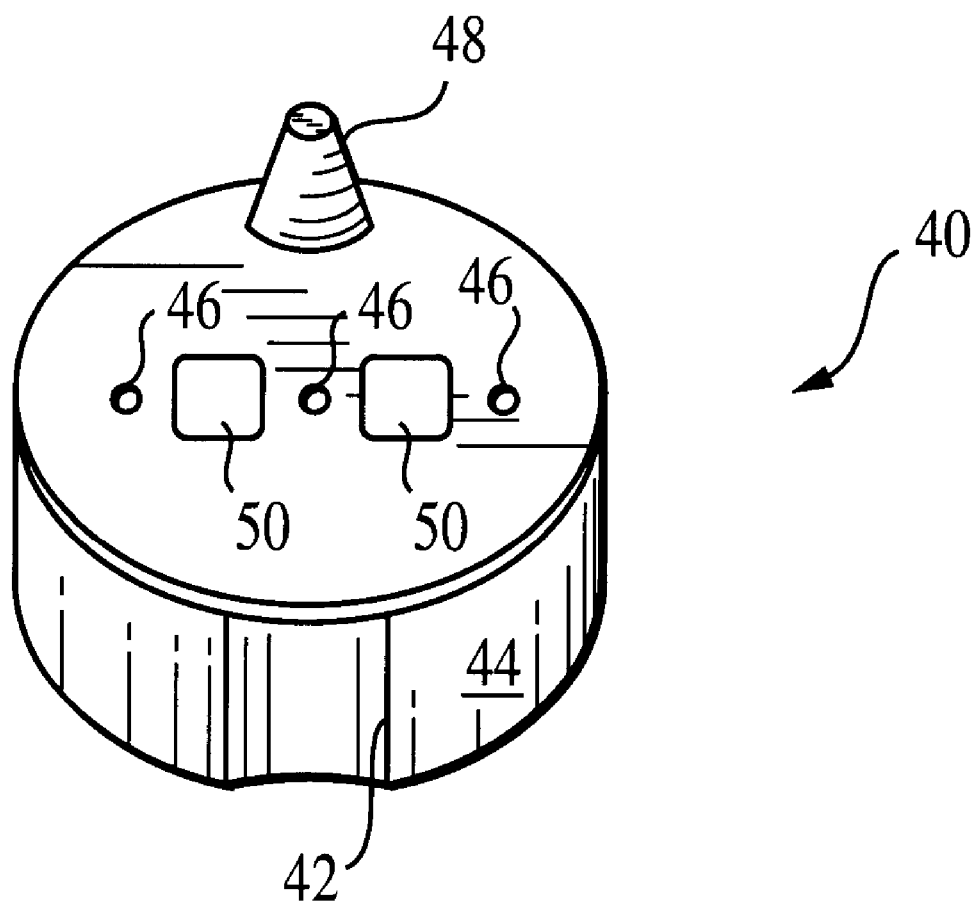
FIG. 7 illustrates a perspective view of the cap of the sensor package.

A cap 40 shown in FIG. 7 may be fitted onto the hollow end of the handle 14 and cover the opening in the handle 14. The cap 40 provides for protection of the inside of the sensor package 10 by prohibiting moisture and foreign matter, as well as the materials to be sensed, to access the interior of the sensor package 10. The cap 40 may include a recess 42 designed to engage projections formed in the interior of the handle 14 (not shown) to prevent the cap 40 from twisting in the handle 14. The cap 40 is thus pushed into the handle 14 in such a manner that the recess engages the projections of the handle 14. Other means may be used to secure the cap 40 in place such as threads on the outer surface of the cap 40 engaging with internal threads on the handle 14. The cap 40 may include an opening 48 through which a power cord, control wires and the like may project. The cap 40 may also be designed to provide status information using, for example, windows 46 that allow light emitting diodes within the sensor package 10 and controlled by the proximity detection circuitry to be readily viewed from the exterior of the sensor package 10. The cap 40 may also include features to allow for control over the operation of the sensor, such as touch pad buttons 50.

FIG. 5 illustrates the sensor package 10 of the present invention in use to detect the presence of materials that do not flow freely (i.e., naturally rest with a significant angle of repose) stored within a container 26. The container 26 has an opening in its top surface designed to allow the tip 16 and main body 12 of the sensor package 10 to pass through. Preferably, the diameter of the opening in the container 26 is less than the diameter of the handle 14 such that the ledge 18 rests on the top surface of the container 26 surrounding the opening in the container 26 and holding the sensor package 10 securely in vertical place.

The sensor package 10 may also be mounted horizontally as well. This can be visualized by simply rotating FIG. 5 ninety degrees in the clockwise direction. If the bulk material to be sensed has a natural angle of repose significantly different than 45 degrees (which may be based on the shape of the container holding the material), the angle of the tip 16 must be adjusted accordingly to reflect a horizontal mount instead of a vertical mounting.

The housing of the sensor package 10 is preferably manufactured from integrally molded resin to protect the sensing element 22 and the associated circuitry from moisture, contaminants, and the like. The use of molded plastic provides the sensor package with greater strength and durability, particularly useful in harsh environments, and can be manufactured relatively easy using an appropriate mold at low cost. The sensor package 10 can also be manufactured from a wide variety of materials, preferably one which is unreactive to the materials to be sensed and is non-conductive. Such materials include plastic, polycarbonate, glass, ceramics, and acrylic.

While the sensor package 10 shown in the drawings herein is cylindrical in shape, various other shapes may be used without departing from the spirit and scope of the present invention. Such other shapes include various multi-sided polygons and ovals.

Thus, the present invention includes a proximity detector housed in a package designed to improve the responsiveness of the sensor to materials that do not flow freely (i.e., naturally rest with a significant angle of repose). The improved proximity detector preferably eases the effort necessary to accurately position the sensing element relative to the material to be sensed. The present invention may be advantageously used to detect the presence of bulk materials naturally having a significant angle of repose, such as animal feed in various storage locations (e.g., silos, feed troughs, grain bins, etc.), or when positioning accuracy is desired without significant installation effort.

Although the present invention has been described in considerable detail with reference to certain presently preferred embodiments thereof, other embodiments are possible without departing from the spirit and scope of the present invention. Therefore the appended claims should not be limited to the description of the preferred versions contained herein.

We claim:

1. A sensor package for housing proximity detector components to detect the presence of materials having a significant angle of repose comprising:

a hollow housing defining a cylindrical main body adapted to house proximity detection circuitry; and a non-planar tip disposed on one end of the housing adjacent the main body, the tip tapering in diameter from a dimension generally equal to the diameter of the main body to a dimension less than the diameter of the main body, the tip adapted to house a sensing element electrically coupled to the proximity detection circuitry and disposed on an inner bottom surface of the tip, wherein the taper of the tip substantially matches the angle of repose of the materials.

2. The sensor package of claim 1 wherein the shape of the tip is selected from the group consisting of cone, frustum, pyramid, round and hemispherical.

3. The sensor package of claim 1 wherein the sensing element is shaped to fit within the tapered tip.

4. The sensor package of claim 3 wherein the tip is frustum-shaped and comprises a flat end surface having a diameter less the diameter of the main body and a tapered side that extends from the outer edge of the flat end surface outwardly to the main body along a predetermined angle, and wherein the sensing element is substantially frustum-shaped and comprises a flat end and a side tapered along an angle substantially equivalent to the predetermined angle of the tapered side of the tip.

5. The sensor package of claim 1 wherein the proximity detection circuitry is disposed on a planar circuit board having edges and wherein the main body further comprises stabilizer grooves molded into an inner surface of the main body including opposing projections facing the proximity detection circuitry and defining a pair of recesses to receive and align at least two edges of the circuit board securely in place.

6. The sensor package of claim 1 wherein the housing has a open-ended handle at an end opposite the tip portion having a cross-sectional width greater than the cross-sectional width of the main body, wherein the housing transitions from the main body to the handle with a step increase in diameter forming a ledge that assists in positioning the sensor package in place.

7. The sensor package of claim 6 further comprising a cap fitted onto the handle and covering the open-ended handle, wherein the cap includes an opening through which a power cord may project to supply electrical power to the proximity detection circuitry.

8. The sensor package of claim 1 wherein the housing is manufactured from integrally molded resin.

9. A hollow housing for a proximity detector including a sensing element and associated proximity detection circuitry electrically coupled to the sensing element detect the presence of materials having a significant angle of repose, the housing comprising:

a hollow main body housing the proximity detection circuitry; and a non-planar tip disposed on one end of the housing adjacent to the main body, the tip tapering in diameter from a dimension generally equal to the diameter of the main body to a dimension less than the diameter of the main body, the tip adapted to house the sensing element disposed on an inner bottom surface of the tip, wherein the taper of the tip substantially matches the angle of repose of the materials;

wherein the housing substantially encloses both the sensing element and the associated proximity detection circuitry in a unitary package.

10. The hollow housing of claim 9 wherein the shape of the tip is selected from the group consisting of cone, frustum, pyramid, round and hemispherical.

11. The hollow housing of claim 9 wherein the sensing element is shaped to fit within the tapered tip.

12. The hollow housing of claim 11 wherein the tip is frustum-shaped and comprises a flat end surface having a diameter less than the diameter of the main body and a tapered side that extends from the outer edge of the flat end surface outwardly to the main body along a predetermined angle, and wherein the sensing element is substantially frustum-shaped and comprises a flat end and a side tapered along an angle substantially equivalent to the predetermined angle of the tapered side of the tip.

13. The hollow housing of claim 9 wherein the proximity detection circuitry is disposed on a planar circuit board having edges and wherein the main body further comprises stabilizer grooves molded into an inner surface of the main body including opposing projections facing the proximity detection circuitry and defining a pair of recesses to receive and align at least two edges of the circuit board securely in place.

14. The hollow housing of claim 9 wherein the housing has a open-ended handle at an end opposite the tip having a cross-sectional width greater than the cross-sectional width of the main body, wherein the housing transitions from the main body to the handle with a step increase in diameter forming a ledge that assists in positioning the sensor package in place.

15. The hollow housing of claim 14 further comprising a cap fitted onto the handle and covering the open-ended handle, wherein the cap includes an opening through which a power cord may project to supply electrical power to the proximity detection circuitry.

16. The hollow housing of claim 9 wherein the housing is manufactured from integrally molded resin.

17. A proximity detection sensor to detect the presence of materials having a significant angle of repose comprising:

a substantially frustum-shaped sensing element comprising a flat end and a side tapered to substantially match the angle of repose of the materials;

proximity detection circuitry electrically coupled to the sensing element; and a hollow housing comprising a cylindrical main body adapted to house the proximity detection circuitry, and a substantially frustum-shaped tip disposed on one end of the housing, the tip comprising a flat end surface having a diameter less the diameter of the main body and a tapered side that extends from the outer edge of the flat end surface outwardly to the main body along a predetermined angle, the tip adapted to house the sensing element disposed on an inner bottom surface of the tip.

18. A sensor package for housing proximity detector components to detect the presence of materials comprising:

a hollow housing defining a cylindrical main body adapted to house proximity detection circuitry; and a non-planar tip disposed on one end of the housing adjacent the main body, the tip tapering in diameter from a dimension generally equal to the diameter of the main body to a dimension less than the diameter of the main body, the tip adapted to house a sensing element electrically coupled to the proximity detection circuitry and disposed on an inner bottom surface of the tip, wherein the tip is frustum-shaped and comprises a flat end surface having a diameter less the diameter of the main body and a tapered side that extends from the outer edge of the flat end surface outwardly to the main body along a predetermined angle, and wherein the sensing element is substantially frustum-shaped and comprises a flat end and a side tapered along an angle subtantially equivalent to the predetermined angle of the tapered side of the tip.

* * * * *